United States Patent [19]

Deakin

[11] Patent Number: 4,579,107

[45] Date of Patent: Apr. 1, 1986

[54] SOLAR ENERGY COLLECTOR AND METHOD OF MAKING SAME

[76] Inventor: David Deakin, 19608 Enterprise Way, Gaithersburg, Md. 20879

[21] Appl. No.: 590,494

[22] Filed: Mar. 16, 1984

[51] Int. Cl.$^4$ .......................... F24J 3/02; C03C 37/00
[52] U.S. Cl. .................................. 126/443; 126/442; 65/3.3; 65/3.31; 350/628
[58] Field of Search ................ 126/442, 443; 427/425, 427/383.5, 428, 432; 65/3.3, 3.31, 3.2; 350/288, 293

[56] References Cited

U.S. PATENT DOCUMENTS

| | | | |
|---|---|---|---|
| 3,047,409 | 7/1962 | Slayter et al. | 65/3.3 X |
| 3,987,781 | 10/1976 | Nozik et al. | 126/901 X |
| 4,080,954 | 3/1978 | de Wilde et al. | 126/901 X |
| 4,153,042 | 5/1979 | Tragert | 126/901 X |
| 4,186,725 | 2/1980 | Schwartz | 126/901 X |
| 4,228,220 | 10/1980 | Garrison | 126/901 X |
| 4,244,354 | 1/1981 | Williams | 126/901 X |

OTHER PUBLICATIONS

"Deposition of Metals on Glass: A Practical Laboratory Guide and Formulary", ASGS-Manual Section 25-1, American Scientific Glassblowers Society, 1969.
"Bonding Solar-Selective Absorber Foils to Glass Receiver Tubes for Use in Evacuated Tubular Collectors: Preliminary Studies", Grimmer et al, Solar Energy, vol. 29, No. 2, pp. 121-124, 1982.
"Metallo-Organics" Data Sheet, Engelhard Industries.
"High Purity Materials for Evaporation and Sputtering", Brochure, Specialty Metals Division, Varian Associates, 1979.
Hermetically Sealed High Strength Fiber Optical Waveguides, Pinnow et al, The Transactions of the IECE of Japan, vol. E61, No. 3, Mar. 1978, pp. 171-173.

*Primary Examiner*—Larry Jones
*Attorney, Agent, or Firm*—Lawrence Harbin

[57] ABSTRACT

Method and device manufactured thereby for economically making solar collectors and concentrators by employing a technique of applying high-efficiency, energy absorptive coatings. The technique is spraying less-than-ultra-pure nickel or chromium, in a molten state, onto a heated surface of a glass absorber substrate so that a thin metallic layer fuses thereon. After spraying, the metallic layer is chemically blackened. An outer glass insulator jacket is hermetically sealed, using a glass-to-glass junction, over the inner glass absorber substrate to provide an insulating space. The spraying technique employed is more economical than by applying the metallic coating by conventional vapor deposition and sputtering techniques which require expensive equipment and ultra-pure metals. Absorption efficiency exceeding 95% with infrared emissions below 0.09% has been achieved. Borosilicate glass is preferred, but other transparent substances can also be used. The technique is employed with both tubular and flat plate type solar collectors and/or concentrators. A getter design and a self-circulation heat-exchange fluid system also are disclosed.

34 Claims, 11 Drawing Figures

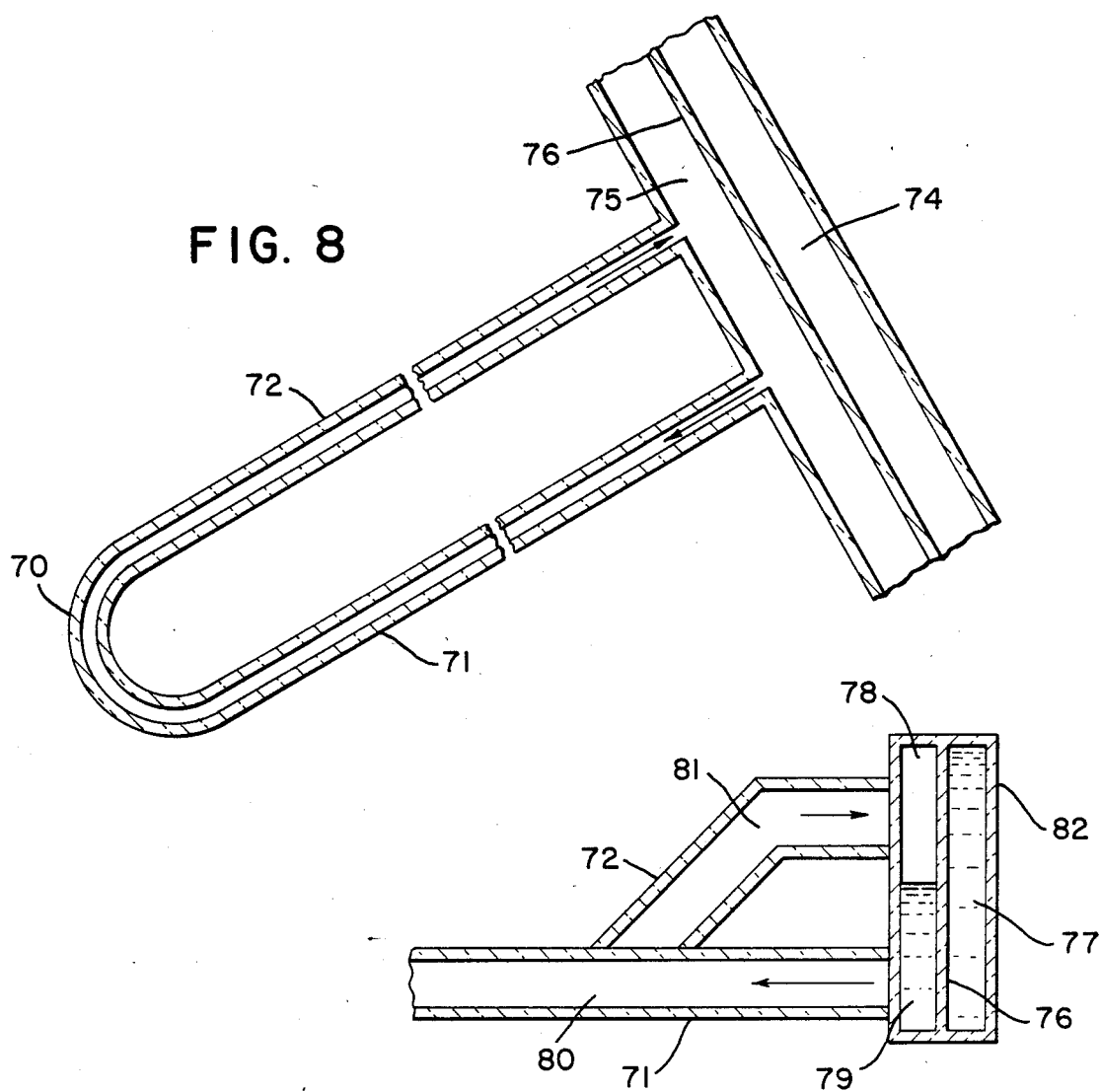
FIG. 8
FIG. 9
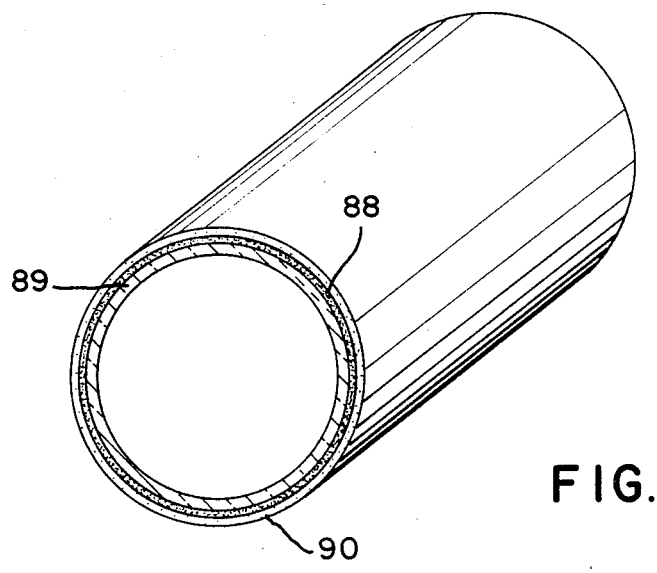
FIG. 10

SOLAR ENERGY COLLECTOR AND METHOD OF MAKING SAME

BACKGROUND OF THE INVENTION

This invention relates to a solar energy collecting device employing a low cost method for making highly efficient selective surface coatings, said device having the ability to reflect and/or concentrate solar energy.

Commercially available solar energy collectors of both tubular and the flat plate type, usually employ a blackened surface to facilitate the absorption of the maximum amount of solar radiation. Blackened surfaces, while being excellent absorbers of solar energy, usually have the drawback of being excellent emitters of radiation as well, and thus lowering the overall efficiency of the unit. Many high efficiency collectors overcome this problem by utilizing what is known in the industry as a solar selective surface coating on the absorber tube or plate. Most selective surfaces of a high quality nature; that is, having high absorption, low emission, no significant degradation with time, and little or no thermal degradation, are formed by blackening a chrome, nickel or as described in U.S. Pat. No. 4,339,484 to Harding, a sputtered carbide surface. Although effective, these coatings are expensive and contribute to a major portion of the overall cost of manufacturing the collector. The goal of any good collector is to attain the highest possible efficiency for the lowest possible cost.

An analysis of solar collectors reveals that the cost of material usually represents eighty to ninety-five percent of the direct manufacturing cost. It is inherently obvious that the easiest way of reducing the cost of manufacturing solar collectors is to reduce material cost. An expanded use of glass has been sought by many to keep down expenses, particularly by those involved in the research and manufacture of tubular or parabolic type collectors consisting of a tubular element or an array of such elements. Each element normally consists of a blackened absorber tube, usually metal, surrounded by a gas filled or an evacuated space with the entire assembly jacketed by a transparent wall, usually a glass tube of larger diameter. Because most elements use high vacuums with pressures of $10^{-4}$ Torr or lower, it is necessary to use materials with low outgassing characteristics.

Stainless steel absorber tubes are typically used. They have the advantage of having the selective surface easily applied by electroplating and have low outgassing rates, but have the disadvantage of being very expensive. The cost of stainless steel tubing is roughly two to four times greater than glass. A significant drawback of using non-glass absorber tubes concerns, because of the wide temperature excursions in the collector and the wide differences in thermal expansion coefficients between the outer glass sheet and the inner metal absorption tube, providing means to accommodate the differences in expansion.

A system disclosed by U.S. Pat. No. 1,855,815 to Abbot addressed this problem back in 1934 with the use of expandable bellows. Many collectors today are manufactured using bellows and/or keepers, however, they are relatively expensive and require the use of glass-to-metal seals which are both difficult to apply and costly.

U.S. Pat. No. 4,151,828 to Mather et al addresses this same problem by sealing with O-rings instead of a direct weld or seal. This solved the expansion problem, however, a person experienced in vacuum technology is aware that O-rings will not hold a hard vacuum of the nature of $10^{-4}$ Torr or less for long durations, not even with the use of getters. A vacuum with pressures higher than $10^{-4}$ Torr may be held for a short time period relative to the expected life of the collector, but vacuum of pressures greater than $10^{-4}$ Torr have proved to be totally ineffective in reducing heat losses either by conduction and/or convection, and therefore, provide no significant insulating capabilities in the solar collector.

The problem of differential expansions between the absorber and the outer glass jacket have been solved by others by using glass as the material of the absorber tube. The glass absorber tube can be easily welded to the outer glass jacket and provides the best possible vacuum seal with the lowest outgassing rate. The glass tubing is also significantly less costly than stainless steel tubing. Other metals such as brass, copper, steel, or aluminum are either too porous or outgas too much to be practical.

Although using a glass absorber has solved many problems inherent in tubular elements, it has created another problem. A selective surface can be easily applied to metal, but such is not the case with glass. For metal absorbers, usually a coating of one or two metals is electroplated onto the tube with the outer metal coating, usually nickel or chrome, chemically blackened in a way to provide optimum optical characteristics. The problem with glass tubing is that it is very difficult to get a metal coating on glass, especially one that has good adhesion and good thermal contact.

Traditionally, skilled artisans have used either evaporative or sputtering techniques. The aforementioned Harding technique uses sputtered carbides. U.S. Pat. No. 4,016,860 to Moan uses vapor deposition. These two mentioned techniques, although effective, require the use of expensive vacuum equipment and raw materials, and hence, the coating is too expensive to be practical.

The Department of Energy, Sandia Laboratories, New Mexico, has experimented with attaching foils with a selective surface to the glass. Although adhesives cannot be used because of high outgassing rates, it tried two other methods, one being glass frits and the other using electrostatic bonding techniques. In both cases, the foils did not provide good thermal contact with the glass and the processes proved too expensive to be practical. Other companies have used spray-on coatings, but optical characteristics and outgassing rates are poor.

U.S. Pat. No. 4,375,807 to Friederich et al describes an elaborate process which is commonly known by those in the electronics industry as organo-metallics. This process, although somewhat effective, is also too expensive to be practical.

Many tubular collectors now being produced have an arrangement to concentrate solar radiation onto the absorber tube by reflection from a surface under or adjacent to the absorber tube. The reflective surface is usually applied to either the inner or outer surface of a transparent glass jacket on the underside or by an entirely separate reflective material arranged in a parabolic shape under the absorber unit with the absorber located at the focal point of the reflective surface. In the first case, reflective metals are vapor deposited or chemically deposited on the glass jacket which, as in the case of the selective surface, has proved to be too expensive to be practical. In the latter case, reflective material forming a parabolic shape are employed by using highly reflective materials which proved once again to be too costly to be practical. An example of such a material is electropolished aluminum with an anodized or acylic coated surface. Another material that is widely used is aluminized polyester which has a relatively low reflection coefficient, and hence results in an overall low efficiency of the unit, and increases the overall cost of the system.

An object of this invention is to provide a means for significantly lowering the overall cost of solar collectors by providing low cost methods of applying a selective surface to most materials, glass in particular, and yet retain a high absorption efficiency of 70% or better with less than 5% infrared emission rates. At the same time, this selective surface must have good thermal contact with its substrate, little or no thermal or ultraviolet degradation, and low outgassing properties.

It is a further goal of this invention to provide a low cost, highly reflective surface than can be applied to glass or other materials.

Another goal of this invention is to provide an improved method for circulation of the thermal absorption fluid in units that use phase change processes, such as Freon, to transfer heat.

A yet further goal of this invention is to enhance the performance of a getter by a factor of ten to one hundred, by increasing the longevity of the collector, and diminishing the size and cost of the getter.

SUMMARY OF THE INVENTION

To attain the above and other objectives of the invention, an improved method is used to create both solar selective surfaces or coatings and reflective surfaces or coatings by depositing, by spraying, molten metal onto their respective substrates so that it fuses upon contact with the substrate. Although suitable for application to most substrates, this method is particularly useful on glass substrates where previous technology was both exotic and very expensive. The technique developed can be used at normal atmospheric pressure and does not require expensive vacuum chambers. Solar selective coatings with 95% + absorption and infrared emissions of less than 0.09% have been achieved on glass substrates. Many other substrates, including plastics, can be used. This method can provide over 75% cost saving over the convention vapor deposition techniques.

In addition, another embodiment uses a technique similar to that described above to apply reflective metals to substrates, e.g., solid metals in a low cost commercial grade form, using inexpensive equipment.

Some of the more recent commercially available solar collectors are using phase change fluids, such as Freon, to transfer the heat in the collector. A further embodiment of the invention circulates the phase change, heat transfer fluid through a novel means of forced circulation brought about by the natural positive pressure of the heated gas.

The use of getters to maintain high vacuums has posed some problems due to premature saturation of the getter. This invention alleviates the problem by using solar radiation in a novel configuration to elevate the temperature of the getter to a level where absorption of gases and water vapor is increased by a factor of ten to one hundred.

Other aspects, advantages, features and objectives will become apparent upon review of the succeeding description taken in connection with the accompanying drawings. The invention, though, is pointed out with particularity by the appended claims.

BRIEF DESCRIPTION OF THE DRAWINGS

FIG. 8 shows a hybrid circulation design where the heat absorption fluid enters and leaves on the same side of the tube.

FIG. 9 is a cross-sectional side view of tubular arrangement of view of FIG. 8.

FIG. 10 is an isometric cross-sectional view of a getter device.

DESCRIPTION OF ILLUSTRATIVE EMBODIMENT

Figure 1:
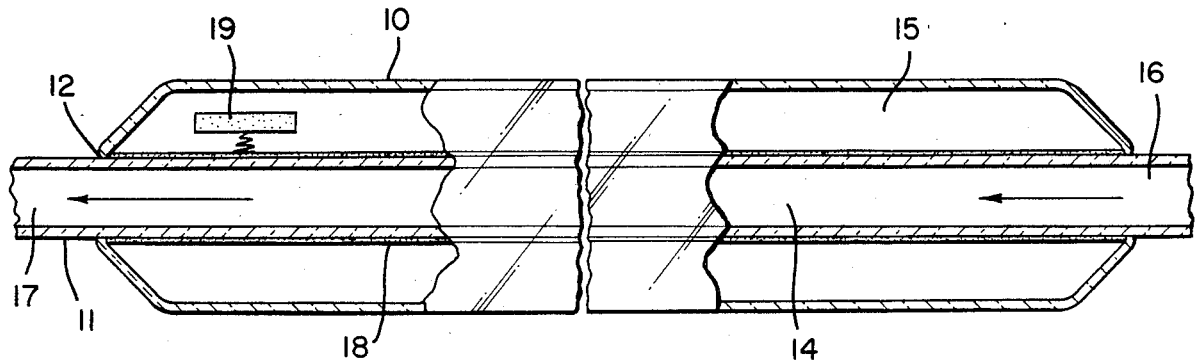
FIG. 1 is a cross-sectional view of a tubular solar collector or element of the present invention.

FIG. 1 is a lengthwise cross-sectional view of a tubular solar collector consisting of an absorber tube 11 surrounded by a transparent housing 10, the housing 10 being hermetically sealed to absorber tube 11 by way of a sealing junction 12. An insulating space 15 is formed between the housing 10 and the tube 11. Solar radiation passing through transparent housing 10 is absorbed by absorber tube 11 which, in turn, is heated. Thermal energy passes through the tube 11 to heat absorbing fluid which is in a heat absorbing contact with absorber tube 11. The heat absorbing fluid 14 enters one end of the collect at 16 and exits to the other end at 17 at a predetermined rate to provide maximum heat absorption and efficiency to the unit.

Figure 2:
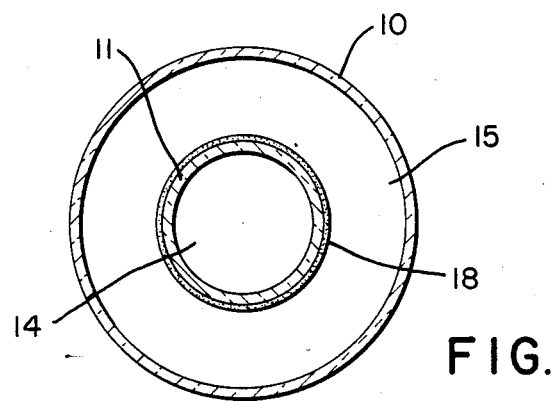
FIG. 2 is a cross-sectional view from the end of a solar absorber tube of FIG. 1 depicting a selective surface of the invention.

FIG. 2 is a cross-sectional view of the same tubular solar collector of FIG. 1, depicting transparent housing 10, the insulating space 15, a solar selective surface 18, the absorber tube 11 and a channel 14 for the heat absorption fluid 14.

Although many different materials may be used for transparent housing 10 and absorber tube 11, the preferred embodiment employs glass for both, fused together at the junction 12 to form a vacuum-tight seal. Space 15 may contain air, or any gas for that matter including insulating gases of the Halocarbon family (see U.S. Pat. No. 4,279,243), however, the preferred embodiment utilizes a hard vacuum with pressures of $10^{-4}$ Torr or lower in space 15 to insulate thermally absorber tube 11 from the external enviroment. Soft vacuums of pressures above $10^{-4}$ Torr may be used, however, they have proved to be very ineffective in insulating the absorber. The insulating quality of a vacuum is determined by the mean free path of the gas molecules and not the fluid pressure or lack of it of the gas.

As discussed briefly above, glass was chosen over stainless steel or other materials for absorber tube 11 because of its lower cost, low outgassing rates, ability to seal easily and effectively to the transparent housing 10 which may be constituted of the same glass, and because of similarity of thermal expansion rates of transparent housing 10 and absorber tube 11 which is particulary important to maintain the seal at the junction 12 during thermal cycles. This arrangement eliminates the need for special seals or expansion bellows at junction 12. Borisilicate glass is the preferred type of glass, however, many other types of glass may also be used effectively.

A solar selective surface 18 is disposed on absorber tube 11 to maximize the amount of solar energy absorbed while at the same time minimizing long wave (infrared) radiation emissions. By utilizing a solar selective surface, somewhat higher collector efficiencies are attained in the cool to medium operating temperature ranges, while dramatic increases in efficiency are realized in the medium to high operating temperature ranges. As discussed above, although glass is a very desirable material for absorber tube 11, it is very difficult and/or expensive to apply a selective surface or coating. Traditionally, these tubes have been metal and the selective surface was applied by electroplating. Because glass cannot be directly electroplated, more exotic means have been developed for applying the selective surface, among them are physical vapor deposition, sputtering and organo-metallics, all of which are very costly and difficult to perform.

The present invention utilizes a unique process of applying the selective surface by fusing a thin layer of metal in the molten state to the surface of the glass, and then, after solidifying the molten metal, blackening the outer surface of the metal coating chemically or by other means. Although nickel and chrome are the most desirable metals to use, many other metals are suitable, nickel being preferred. The process used to apply the metal to the glass is similar to that used to apply such material as zinc to steel and concrete bridge structures to keep the steel from oxidizing. The present invention, however, uses a solid nickel rod which is continuously fed into a fixture where it is melted by an oxy-acetylene burner, or any other suitable burner or melting device, while a pressurized gas, usually air, is forced through the fixture sweeping the molten nickel out through an orifice where it is broken up into smaller particles and leaves the fixture as a molten nickel spray.

The molten spray is directed onto the glass absorber tube 11 where it forms a thin coating 18 fused thereon. The preferred embodiment uses a round absorber tube 11 which is held spinning at a suitable speed so that the nickel spray will form a fairly uniform coating. This coating 18 will be textured because, in practice, it consists of many small droplets of molten nickel hitting the glass surface and solidifying. Before the molten drops of nickel completely solidify, they are fused due to heat with the glass of absorber tube 11. Because of this, excellent thermal contact is made between the selective surface 18 and the absorber tube 11 proving a superior heat exchanger relationship. A thickness of 0.004 inches to 0.007 inches is found to be a desirable thickness of coating 18 when measured conventionally by callipers or micrometers. However, because of the textured nature of the coating only the peaks are measured making it seem as if the coating is thicker than it actually is. If the peaks and valleys of coating 18 are leveled, it would measure 0.00075 inches to 0.002 inches. This process may be performed at normal atmospheric pressure and does not require the use of expensive and complicated vacuum chambers as in the case with vapor deposition and sputtering processes.

The adhesion of the selective surface coating 18 to the absorber tube 11 is enhanced by roughing up the surface of the glass by bead blasting or any other suitable method. If the glass surface has been bead blasted, the molten nickel spray can be applied with the glass absorber tube 11 at room temperature. The coating 18 will adhere even better if the glass absorber tube 11 has been heated to a higher temperature, preferably to one slightly lower than the sagging (annealing) temperature of the glass. About 850° F.-900° F. provides good results for soda-lime glass. Care must be exercised after heating the glass absorber tube 11 to anneal the glass properly so that no cracks or stresses are set up in the glass. As mentioned before, the preferred embodiment utilizes nickel for the selective surface deposited directly onto the glass absorber tube 11, however, this invention is not limited to the use of nickel, as other metals, such as chrome, also work well. Where desired, different layers of two or more metals maybe used or the glass may be coated with a molten spray coating according to the invention and then electroplated in a more conventional manner. The preferred embodiment also uses glass as the absorber tube, however, this invention is not limited to the use of glass. The technique of spraying molten metal onto a substrate will work on many materials including steel, most metals, ceramics, and plastics. Also the scope of this invention goes beyond the use of an absorber tube in a transparent housing. The technique of spraying molten metal onto the absorber surface to form a selective surface may be used on any type of solar collection device including a flat plate collector.

Once the absorber tube 11 has been coated with nickel or the desired metal, the coating may be chemically etched and blackened in a manner so as to yield good optical qualities for a selective surface, i.e., high absorption and low emission. The chemical blackening can be performed very inexpensively by conventional methods used by anyone experienced in the field of solar selective coatings, such as that used by Ergenics, Inc. of Wyckoff, N.J. conventionally known as the Maxorb Process.

Repeated tests for producing a solar selective coating described herein have yielded very favorable results of 95% absorption with 0.09% or less emissions. The nickel used in these tests, commercially known as Alloy 200 is fairly pure, about 99% but not ultra pure (99.99%) as is needed with sputtering, vapor depositing and other exotic techniques. The nickel, Alloy 200, is commercially available and can be used in standard rod form. Chrome is even less expensive. Yields of 8-20 $FT^2/lb$. of nickel have been successfully utilized. Although the solar selective coatings created by various other methods already described, are often thinner, the exhorbitant cost of the material and high capital investment for exotic equipment makes these processes much more expensive, sometimes as much as by a factor of ten. The method described in this invention produces the same high efficiency for a significantly lower price, thus lowering the cost of the solar collectors themselves by limiting the cost of one of the traditionally more expensive components, the solar selective coated absorber.

Figure 4:
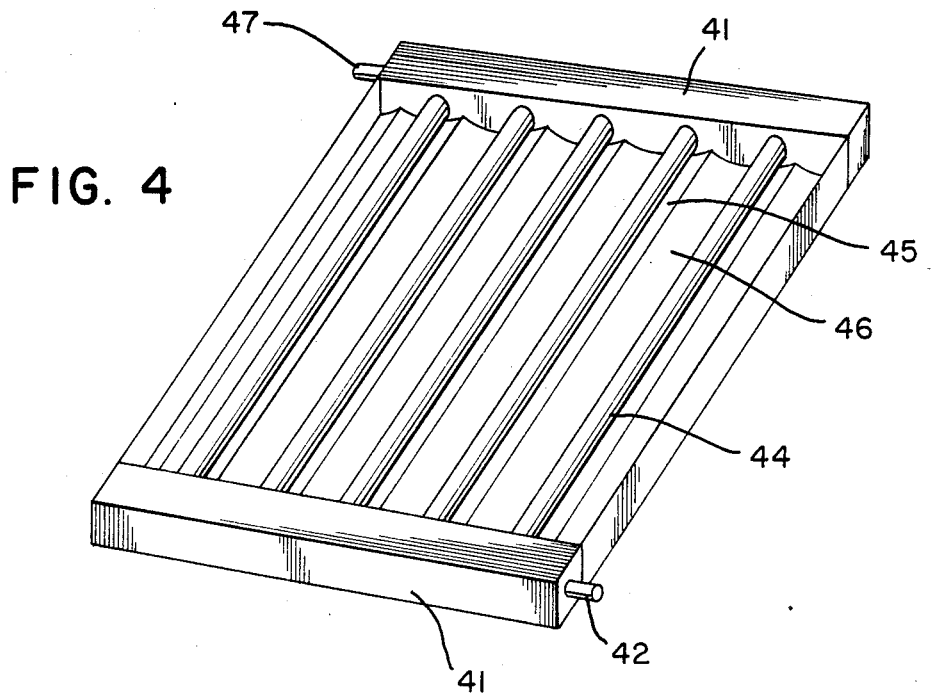
FIG. 4 shows an isometric view of a solar panel comprising an array of individual heat absorbing tubes of FIG. 1 with a reflective surface focusing solar energy on them.

FIG. 4 show an isometric view of a complete solar collector unit which consists of a series of parallel tubular collector elements 44 spaced apart with reflective surfaces 45 and 46 reflecting and concentrating solar energy back onto tubular collector element 44. The housings 41 at each end contain a manifold that connects each of the parallel tubular elements 44. Inlet 42 receives the thermal absorption fluid and outlet 47 expels the thermal absorption fluid.

Figure 5:
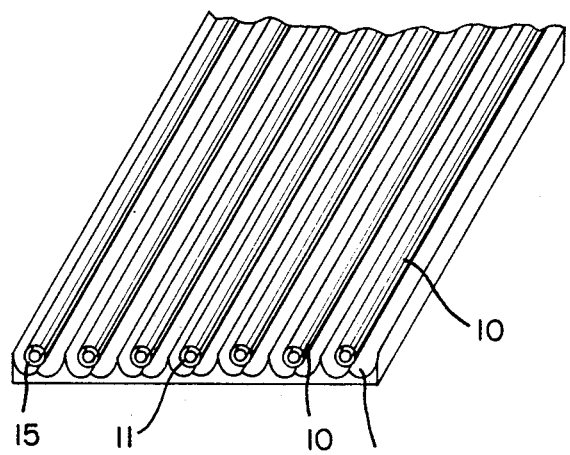
FIG. 5 shows a cross-sectional isometric view of a typical collector of FIG. 4 utilizing a hybrid parabolic shape for the reflector surfaces.
Figure 7:
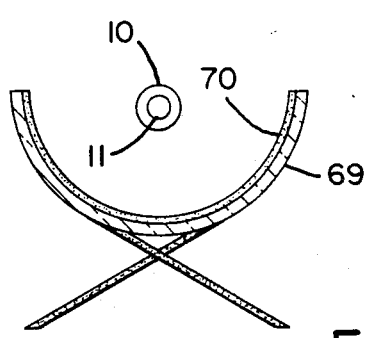
FIG. 7 shows a cross-sectional view of a typical parabolic trough-type collector.

FIG. 5 shows a cross-sectional view of a cutaway portion of a similar arrangement of FIG. 4 with the solar absorber tube 11 being surrounded by transparent housing 10 insulated by space 15. This particular model shows the reflective surface 46 in the shape of two modified parabolic reflectors in a hybrid formation. FIG. 7 shows the same type tubular element used in FIGS. 1, 2, 4 and 5 used in a slightly different application of a trough-type parabolic collector. Parabolic shaped substrate 69 has a reflective surface 70 which receives solar radiation which it reflects and concentrates through transparent housing 10 onto absorber tube 11.

Figure 3:
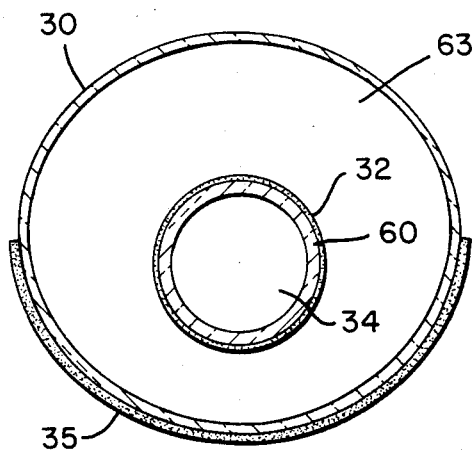
FIG. 3 is a cross-sectional view similar to FIG. 2 showing a modification whereby the tubular solar collector has reflective capability.

FIG. 3 shows a tubular collector element with a slight variation. It consists of an outer transparent housing 30 with absorber tube 60 and selective surface 32. Absorber tube 60 is insulated by insulating space 63 which may contain a gas or vacuum, the thermal energy from absorber tube 60 being absorbed and transferred to a heat absorbing fluid passing through channel 34. The underside of this tubular element has a reflective coating 35 which reflects and concentrates solar energy onto absorber tube 60. The shape of transparent housing 30 may be circular or be comprised of different shapes so as to facilitate the reflectiveness and concentration of solar energy onto absorber tube 60. For example, the underside maybe a parabolic shape.

Reflective surface 35 may be formed in a manner similar to the method used to create the selective surface described with respect to FIG. 1. Molten metal, preferrably having good reflective properties, is sprayed onto the outside of the lower part of housing 30. The molten metal fuses to the transparent housing, preferably glass, and forms a textured coating similar to that achieved on the selective surface. Because the outside is textured and irregular, it is not very reflective, however, the inner surface where it fuses to transparent housing 30 is smooth and highly reflective. Again this process can be done at atmospheric pressure without the use of vacuum chambers with very low capital investment costs for equipment. The standard practices for coating glass substrates with reflective metals are very similar to those described earlier pertaining to selective surfaces. Chemical deposition, vapor deposition and organo-metallics are among the most widely used, which once again, use materials and/or equipment that is expensive.

Figure 6:
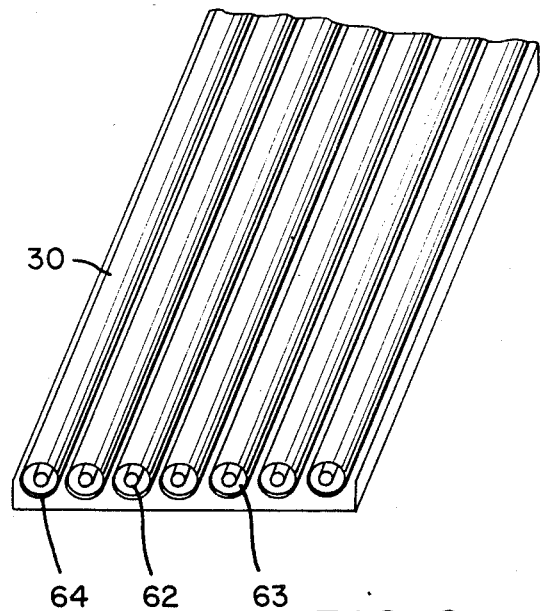
FIG. 6 shows a cross-sectional isometric view of a collector panel consisting of an array of collector tubes or elements where the inventive reflective surface is disposed on a transparent housing.

FIG. 6 shows a cutaway view of an array of tubular collector elements of FIG. 3 which can be placed side-by-side in parallel fashion joined at their ends by a manifold. Housing 30 is transparent and supports the reflective surfaces 64. The solar absorber tube 62 is insulated by gas filled or evacuated space 63 as described above.

FIG. 8 shows a manifold form of the circulatory path of the heat absorption fluid for a tubular solar collector or element. The circulator tubes 71 and 72 are fused either to the inside of a solar absorber tube or to a solar absorption substrate of any shape, the purpose being to absorb and transport the thermal energy away from the chamber itself. This configuration has been used by several manufacturers of solar collectors with many using a phase change fluid such as Freon as the heat absorption medium. Heat is absorbed by tube 71 and 72 from the absorber tube or substrate and heats the absorption fluid in tubes 71 and 72 causing it to undergo a phase change. The resultant gas is carried up tubes 71 and 72 where it enters chamber 75 of heat exchanger 73. The gas comes into physical contact with exchanger wall 76 where it condenses and the latent heat of vaporization and any sensible heat is transferred to the wall 76 and into the circulation fluid contained in chamber 74. As the gas condenses, it falls out and works it way back down into heat absorption tubes 71 and 72.

FIG. 9 shows a modified version of FIG. 8 which is contained in the present invention. The heat absorption fluid described in FIG. 8 often, in the present state of art, has a difficult time being dispersed uniformly through tubes 71 and 72, particularly if the tubes have a small diameter. Vapor lock can occur with the gas on one side and the fluid on the other. The present invention eliminates this problem by setting up a natural forced circulation pattern. As seen in FIG. 9, heat transfer tube 72 is elevated above tube 71 where it enters the heat exchanger 82. As the heat absorption fluid is heated and turns to vapor 81, it enters the heat exchanger in chamber 78 where it condenses against wall 76 and through to circulatory fluid 77. Circulation fluid 77 is carried out of the collector for storage or form immediate use. As the vapor 81 turns to liquid in 78 it falls out and creates a reservoir 79. The heated vapor in chamber 78 will form a slight positive pressure forcing the cooler liquid 80 out of chamber 79 and into exit tube 71 where it circulates down through the absorber back around to inlet tube 72, where it has picked up more heat and turned once again to a gas. In this manner a continuous uniform circulation pattern will result, reducing the chance of vapor lock and the formation of hot spots on the absorber.

FIG. 10 shows one form of a getter apparatus as modified according to the present invention. A getter is known by those familiar with state of the art of high vacuum technology as a device capable of absorbing gas molecules that contaminate a high vacuum usually the result of outgassing and/or the penetration of such molecules as Helium or Hydrogen. A getter device usually consists of rare earth metals such as Barium or Cesium that are placed in a vacuum and activated by heating. This heat of activation usually lasts for short duration and the getter is allowed to cool to ambient temperature. However, it has been found that if the temperature of the getter is kept elevated, the total amount of absorption by the getter and the rate of absorption is dramatically increased by factors of ten to one hundred, or even more, depending on the temperature. Thus, it becomes apparent that both the life expectancy and efficiency of an evacuated collector are significantly enhanced by keeping the getter at an elevated temperature.

U.S. Pat. No. 4,306,543 to Doevenspeck et al uses both an electric element and a solar concentrating device to elevate the temperature of the getter. This method should work fairly well, however, it has the drawbacks of being cumbersome and somewhat expensive. The present invention utilizes a much simpler and less costly method for achieving the same purpose. The getter material is placed inside a housing with sufficient openings as to allow random gas molecules to reach the getter. The outer surface of the housing is coated with a solar selective surface, as defined previously and placed in the collector element where it will be in direct, reflected, or concentrated sunlight. The getter apparatus should have as little thermal contact as possible with any of its surrounding, however, the getter material should be in a good heat exchange contact with the getter housing to enhance heat of conduction. When sunlight strikes the getter apparatus, the getter temperature will continue to increase until it reaches a point of equilibrium whereby the solar energy absorbed is equal to the net loss of energy due to radiation and conduction. At low vacuum pressures, no heat loss from convection will occur. Care must be exercised in the design of the getter so that the temperature never equals or exceeds that of the activation temperature otherwise the getter will outgas at a very significant rate. The optimum temperature should normally be 25° C.–75° C. below activation temperature. A typical maximum continuous use temperature would be 400° C.

FIG. 10 shows the cross-section of a typical getter apparatus as described with a tubular housing 89 with selective surface 88 and a getter coating 90. The getter material may be in many forms including a coating, pellet, or exploding capsule. The getter in whatever form chosen should be placed inside the getter housing having good thermal contact with the housing with the openings designed so as to eliminate or reduce radiation from the inside of the getter apparatus, while still allowing adequate passage of gas molecules to the getter material itself. For example, the ends of the tube might have turns or elbows or singular or multiple grates with holes or slots. The preferred embodiment uses a tubular shape with the ends bent at 90°, however, it should be noted that this invention is not limited to any particular shape or configuration.

Figure 11:
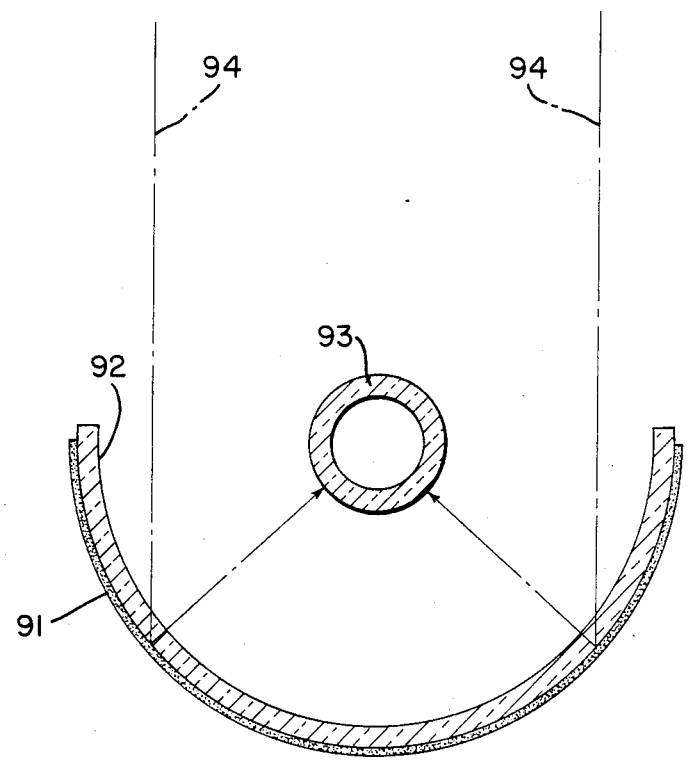
FIG. 11 depicts the cross-sectional view of a solar concentrating apparatus embodying a reflective surface formed in accordance with the present invention.

FIG. 11 depicts another embodiment of the invention wherein a reflecting apparatus for a solar concentrating device is constituted by a curved glass element 92 having on the external surface thereof molten metal sprayed in a layer 91 in accordance with the process described herein. Accordingly, the inner side of the outer surface of the glass element 92 forms a reflecting surface in conjunction with the metallized layer fused thereon to concentrate solar rays 94 onto an absorber tube 93.

It should be noted that only the preferred embodiments have been disclosed and that the scope of this invention is not limited to any one particular shape, size, configuration, or material. Changes or modifications of this nature may be made without departing from the spirit of the invention.

I claim:

1. A method of making a solar energy collecting device which includes glass absorbing means for absorbing radiant energy and transferring said energy to a heat transfer fluid carried thereby, and insulating means for passing therethrough radiant energy while insulating said absorbing means from an external environment, said method comprising:

melting a metallic substance to form molten metal,
spraying said molten metal on said glass absorbing means by use of a stream of pressurized gas so as to fuse a metallic layer thereon,
blackening the metallic layer, and
hermetically sealing together said glass absorbing means and said insulating means so as to form an insulating chamber therebetween,
whereby the absorbing means absorbs, when the collecting device is operational, solar energy at a level of at least 70% and passes the same to said heat transfer fluid while emitting no more than 5% energy in the infrared range.

2. A method of making a solar energy collecting device as recited in claim 1 further comprising the step of:

heating said absorbing means before the spraying step.

3. A method of making a solar energy collecting device as recited in claim 2 wherein said insulating means comprise glass, said blackening step is performed chemically, and said method further comprises the step of:

evacuating the chamber between said absorbing means and said insulating means.

4. A method of making a solar energy collecting device as recited in claim 3 further comprising evacuating said chamber to a pressure of at least $10^{-4}$ Torr.

5. A method of making a solar energy collecting device as recited in claim 4 wherein said absorbing means comprises a glass tube of a first diameter and said insulating means comprises a glass tube of a second larger diameter, and in the spraying step, said method further comprises the step of:

in the spraying step, rotating said heated inner absorbing tube while spraying molten metal thereon, and
in the sealing step, sealing together the glass tubes at respective ends thereof so as to form an annular insulating chamber therebetween.

6. A solar energy collecting device having an absorbing means produced by any one of the methods recited in claim 4.

7. A method of making a solar energy collecting device as recited in claim 3 further comprising, after the evacuating step, filling said chamber with a Halocarbon gas.

8. A method of making a solar energy collecting device as recited in claim 7 wherein said absorbing means comprises a glass tube of a first diameter and said insulating means comprises a glass tube of a second larger diameter, said method further comprises the step of:

in the spraying step, rotating said heated inner absorbing tube while spraying said molten metal thereon, and
in the sealing step, sealing together the glass tubes at respective ends thereof so as to form an annular insulating chamber therebetween.

9. A solar energy collecting device having an absorbing means produced by any one of the methods recited in claim 7.

10. A method of making a solar energy collecting device as recited in claim 3 wherein, in said spraying step, said metal is selected from the group of nickel and chromium.

11. A method of making a solar energy collecting device as recited in claim 10 wherein said absorbing means comprises a glass tube of a first diameter and said insulating means comprises a glass tube of a second larger diameter, said method further comprises the step of:

in the spraying step, rotating said heated inner absorbing tube while spraying said molten metal thereon, and in the sealing step, sealing together the glass tubes at respective ends thereof so as to form an annular insulating chamber therebetween.

12. A method of making a solar energy collecting device as recited in claim 3 wherein said absorbing means comprises a glass tube of a first diameter and said insulating means comprises a glass tube of a second larger diameter, and said method further comprises the steps of:

in the spraying step, rotating said glass absorbing tube while spraying said molten metal thereon, and in the sealing step, sealing together the glass tubes at respective ends thereof so as to form an annular insulating chamber therebetween.

13. A solar energy collecting device having an absorbing means produced by any one of the methods recited in claim 12.

14. A method of making a solar energy collecting device as recited in claim 3 wherein, in the spraying step, said metal has a purity less than ultra-pure normally required for a sputtering technique and a vapor deposition technique 15. A solar energy collecting device having an absorbing means produced by any one of the methods recited in claim 14.

16. A method of making a solar energy collecting device as recited in claim 3 further comprising, after the spraying step, the step of:

electroplating a solar selective coating onto said metallic layer.

17. A method of making a solar energy collecting device as recited in claim 3 wherein, in the spraying step, the metallic layer is textured with a roughened surface to facilitate adherence of a selective surface thereon.

18. A method of making a solar energy collecting device as recited in claim 3 wherein, before the spraying step, said method further comprises the step of:

roughening the surface of said absorbing means so as to improve the adhesion of said metallic layer thereto.

19. A method of making a solar energy collecting device as recited in claim 18 wherein said roughening step is performed by bead blasting.

20. A solar energy collecting device having an absorbing means produced by any one of the methods recited in claim 1.

21. A method of making a solar energy concentrator for use with solar absorbing means for absorbing solar energy and for transferring said solar energy to a heat transfer fluid carried thereby, said concentrator including solar energy concentrating means for directing radiant energy onto said absorbing means, said concentrating means being made by the steps of:

forming a transparent glass member in a shape so that, when disposed about said absorbing means, an inner surface of said transparent member faces and is adapted to direct radiant energy onto said absorbing means, and melting a metallic substance to form molten metal, spraying said molten metal on an outer surface of said transparent glass member by use of a stream of pressurized gas so as to fuse thereon a thin metallic layer thereby to form a smooth, highly reflective concentrator for directing radiant energy onto said absorbing means.

22. A solar energy concentrator having a concentrating means for directing radiant energy onto an absorbing means, said concentrator being produced by the method recited in claim 21.

23. A solar energy collecting device comprising:

heat absorbing means made of glass for absorbing radiant energy and for transfering said radiant energy to a heat transfer fluid carried thereby, insulating means for passing therethrough radiant energy while insulating said heat absorbing means from an external environment, said absorbing means being formed by the process of:

melting a metallic substance to form molten metal, spraying said molten metal by use of a stream of pressurized gas so as to fuse on said glass absorbing means a thin metallic layer, and blackening said metallic layer so as to form a solar selective coating, and sealing means for hermetically sealing together said glass absorbing means and said insulating means so as to form an insulating chamber therebetween, whereby the heat absorbing means absorbs solar energy at a level of at least 70% and passes the same to said heat transfer fluid while emitting no more than 5% energy in the infrared range.

24. A solar energy collecting device as recited in claim 23 wherein said absorbing means comprises an inner glass tube having a first diameter and said insulating means comprises an outer glass tube having a second larger diameter, said tubes being hermetically sealed at respective ends thereof so as to form an annular insulating chamber therebetween.

25. A solar energy collecting device as recited in claim 23 wherein said absorbing means comprises an inner glass plate and said insulating means comprises an outer glass plate, said plates being hermetically sealed at respective edges thereof so as to form an insulating chamber therebetween.

26. A solar energy collecting device as recited in claim 24 or 25 wherein said insulating chamber is filled with a halocarbon gas.

27. A solar energy collecting device as recited in claim 26 wherein the molten metal comprises chromium or nickel.

28. A solar energy collecting device as recited in claim 27 wherein said metal has a purity less than ultra-pure normally required for vapor deposition and sputtering techniques.

29. A solar energy collecting device as recited in claim 27 wherein said thin metallic layer further includes a solar selective surface electroplated thereon.

30. A solar energy collecting device as recited in claim 29 wherein said absorbing means includes a roughened surface on which said molten metal is sprayed.

31. A solar energy collecting device as recited in claim 27 wherein said absorbing means includes a roughened surface on which said molten metal is sprayed.

32. A solar energy collecting device as recited in claim 28 wherein said thin metallic layer further includes a solar selective surface electroplated thereon.

33. A solar energy collecting device as recited in claim 28 wherein said absorbing means includes a roughened surface on which said molten metal is sprayed.

34. A solar energy collecting device as recited in claim 32 wherein said absorbing means includes a roughened surface on which said molten metal is sprayed.

* * * * *